(12) United States Patent
Chen et al.

(10) Patent No.: US 12,597,801 B2
(45) Date of Patent: Apr. 7, 2026

(54) FAST AUTOMATIC TRANSFER SWITCHING CIRCUIT AND CONTROL METHOD THEREOF

(71) Applicant: Schneider Electric Industries SAS, Rueil Malmaison (FR)

(72) Inventors: Jiamin Chen, Shanghai (CN); Haijun Zhao, Shanghai (CN); Ying Shi, Shanghai (CN); Xiaohang Chen, Shanghai (CN); Kunpeng Zhang, Shanghai (CN); Qing Yang, Shanghai (CN); Yangfeng Song, Shanghai (CN); Jihua Dong, Shanghai (CN)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 18/563,706

(22) PCT Filed: Jun. 29, 2023

(86) PCT No.: PCT/CN2023/103903
§ 371 (c)(1),
(2) Date: Nov. 22, 2023

(87) PCT Pub. No.: WO2024/002250
PCT Pub. Date: Jan. 4, 2024

(65) Prior Publication Data
US 2025/0007325 A1    Jan. 2, 2025

(30) Foreign Application Priority Data
Jun. 30, 2022    (CN) .......................... 202210771263.7

(51) Int. Cl.
*H02J 9/06* (2006.01)

(52) U.S. Cl.
CPC .............. *H02J 9/068* (2020.01); *H02J 9/062* (2013.01)

(58) Field of Classification Search
CPC .. H02J 9/068; H02J 9/062; H02J 3/007; H02J 9/06
See application file for complete search history.

(56) References Cited

U.S. PATENT DOCUMENTS 3,526,778 A    9/1970    Crocker et al.
6,169,390 B1 *    1/2001    Jungreis .................... H02J 9/08
307/64
(Continued)

FOREIGN PATENT DOCUMENTS

CN    1592031 A    3/2005
CN    1881743 B    5/2010
(Continued)

OTHER PUBLICATIONS

Extended European Search Report dated Mar. 17, 2025 for corresponding European Patent Application No. 23806158.4, 9 pages.
(Continued)

*Primary Examiner* — Daniel Cavallari
(74) *Attorney, Agent, or Firm* — Patterson + Sheridan, LLP

(57)    ABSTRACT

According to an aspect of the present disclosure, there is provided a switching circuit including a main power supply circuit connected between power sources and a load, wherein the power sources include a first power source and a second power source, and the main power supply circuit includes a transfer switch connected between the power sources and the load and configured to switch between the first power source and the second power source; and a power electronic switch for turning on or off the main power supply (Continued)

circuit, wherein the power electronic switch is connected between the transfer switch and the load.

13 Claims, 4 Drawing Sheets

(56) References Cited

U.S. PATENT DOCUMENTS

| | | | | |
|---|---|---|---|---|
| 10,177,586 | B2 * | 1/2019 | Kim | H02H 3/087 |
| 11,211,816 | B1 | 12/2021 | Bose et al. | |
| 2003/0048004 | A1 | 3/2003 | Fleming et al. | |
| 2003/0048005 | A1 | 3/2003 | Goldin et al. | |
| 2006/0071554 | A1 * | 4/2006 | McNamara | H02J 9/08 |
| | | | | 307/10.1 |
| 2006/0226706 | A1 | 10/2006 | Edelen et al. | |
| 2009/0072623 | A1 | 3/2009 | Liao | |
| 2013/0106190 | A1 | 5/2013 | Lin et al. | |
| 2017/0256984 | A1 * | 9/2017 | Ding | H02J 9/08 |
| 2017/0317525 | A1 | 11/2017 | Navarro et al. | |
| 2020/0014239 | A1 * | 1/2020 | Liu | H02M 1/08 |
| 2021/0249898 | A1 | 8/2021 | Schecter et al. | |
| 2021/0305840 | A1 | 9/2021 | Wu et al. | |

FOREIGN PATENT DOCUMENTS

| | | | |
|---|---|---|---|
| CN | 104539042 | A | 4/2015 |
| CN | 204349572 | U | 5/2015 |
| CN | 105024450 | A | 11/2015 |
| CN | 106410951 | A | 2/2017 |
| CN | 107508457 | A | 12/2017 |
| CN | 108808834 | A | 11/2018 |
| CN | 109412259 | A | 3/2019 |
| CN | 109461609 | A | 3/2019 |
| CN | 105024450 | B | 11/2019 |
| CN | 110601351 | A | 12/2019 |
| CN | 209844635 | U | 12/2019 |
| CN | 111009956 | A | 4/2020 |
| CN | 111082425 | A | 4/2020 |
| CN | 214626494 | U | 11/2021 |
| CN | 216016528 | U | 3/2022 |
| CN | 114430196 | A | 5/2022 |
| WO | 2018113704 | A1 | 6/2018 |
| WO | 2021197607 | A1 | 10/2021 |

OTHER PUBLICATIONS

International Search Report issued in PCT/CN2023/103903, mailed Oct. 13, 2023.

International Search Report and Written Opinion dated Sep. 13, 2023 for International Patent Application No. PCT/CN2023/103254, 12 pages.

International Search Report and Written Opinion dated Sep. 14, 2023 for International Patent Application No. PCT/CN2023/103932, 12 pages.

International Search Report and Written Opinion dated Sep. 22, 2023 for International Patent Application No. PCT/CN2023/105027, 12 pages.

International Search Report and Written Opinion dated Sep. 27, 2023 for International Patent Application No. PCT/CN2023/104605, 12 pages.

Non-Final Office Action dated Dec. 18, 2024 from U.S. Appl. No. 18/563,303, 12 pages.

Extended European Search Report dated Feb. 13, 2025 for European Patent Application No. 23809940.2, 8 pages.

Extended European Search Report dated May 13, 2025 for European Patent Application No. 23806161.8, 7 pages.

Extended European Search Report dated May 16, 2025 for European Patent Application No. 23809075.7, 9 pages.

Non-Final Office Action dated Jul. 2, 2025 from U.S. Appl. No. 18/565,634, 33 pages.

* cited by examiner

FAST AUTOMATIC TRANSFER SWITCHING CIRCUIT AND CONTROL METHOD THEREOF

CROSS-REFERENCE TO RELATED APPLICATION(S)

This application claims priority of Chinese application CN 202210771263.7 filed on Jun. 30, 2022 at China National Intellectual Property Administration.

TECHNICAL FIELD

The present disclosure relates to a switching circuit and a control method thereof, and more specifically, to an automatic transfer switching (ATS) circuit and a control method thereof.

BACKGROUND

In industry, an automatic transfer switching (ATS) circuit (or automatic transfer switching element (ATSE)) is mainly used to transfer between a main power source and a standby power source (or among multiple power sources) so as to continuously supply power to a load. In order to implement such power source transfer, two types of fast ATS circuit structures are given at present: 1) a mechanical structure and 2) a solid-state structure.

However, in the two types of fast ATS circuit structures given at present, there are the following problems respectively. In the case of the mechanical structure, breaking and arcing will cause damage to a mechanical electronic structure (for example, a mechanical switch), a short lifespan, a power grid circulation, etc., while in the case of the solid-state structure, the product cost (especially the switching element cost on the main power loop) is high.

SUMMARY

Technical Problem

The current mechanical structure and solid-state structure of the fast ATSs have the problems of damage to the mechanical electronic structure (for example, the mechanical switch) caused by the breaking and arcing, short lifespan, power grid circulation and high product cost (especially the switching element cost on the main power loop) respectively. Therefore, a fast ATS circuit, which can not only prevent the mechanical switch from arcing, but also reduce the switching element cost of the solid-state structure is needed.

Solution to Problem

According to an aspect of the present disclosure, there is provided a switching circuit including a main power supply circuit connected between power sources and a load, wherein the power sources include a first power source and a second power source, and the main power supply circuit includes a transfer switch connected between the power sources and the load and configured to switch between the first power source and the second power source; and a power electronic switch for turning on or off the main power supply circuit, wherein the power electronic switch is connected between the transfer switch and the load.

In an embodiment, the switching circuit further includes an auxiliary power supply circuit connected in parallel with the main power supply circuit, wherein the auxiliary power supply circuit includes a first switch connected to the first power source; a second switch connected to the second power source; and a convert circuit connected between the first switch and the second switch with the load and configured to control an output to the load.

In an embodiment, the switching circuit further includes a detection unit for detecting states of the first power source and the second power source; and a control unit configured to perform, based on a detection result of the detection unit, at least one of: controlling the transfer switch to switch between the first power source and the second power source; controlling turn-on and turn-off of the first switch and the second switch; and controlling turn-on and turn-off of the power electronic switch.

In an embodiment, the power electronic switch includes at least one of a silicon-controllable rectifier (SCR), a metal-oxide semiconductor field effect transistor (MOSFET), an insulated gate bipolar transistor (IGBT), an integrated gate commutated thyristor (IGCT) and a triode AC semiconductor switch (TRIAC).

In an embodiment, the convert circuit includes an alternating current to direct current (AC/DC) module and a direct current to alternating current (DC/AC) module that are connected in series.

According to another aspect of the present disclosure, there is provided a control method of a switching circuit which is connected between a first power source and a second power source with a load and includes a transfer switch and a power electronic switch, the transfer switch configured to switch between the first power source and the second power source, the method including turning off a first main power supply path by turning off the power electronic switch, wherein the first main power supply path is a path through which the first power source supplies power to the load via the transfer switch and the power electronic switch; turning on a second auxiliary power supply path to supply power to the load, wherein the second auxiliary power supply path is connected in parallel with the first main power supply path; switching the first main power supply path to a second main power supply path by switching the transfer switch from the first power source to the second power source, wherein the second main power supply path is a path through which the second power source supplies power to the load via the transfer switch and the power electronic switch; turning on the second main power supply path by turning on the power electronic switch to supply power to the load; and turning off the second auxiliary power supply path, wherein the power electronic switch is connected between the transfer switch and the load.

In an embodiment, the second auxiliary power supply path is a path through which the second power source supplies power to the load via a second switch and a convert circuit for controlling an output to the load; and wherein turning off and turning on the second auxiliary power supply path is controlled by the second switch and/or the convert circuit.

In an embodiment, a first auxiliary power supply path is further arranged between the first power source and the load, the first auxiliary power supply path being a path through which the first power source supplies power to the load via the first switch and the convert circuit, wherein turning off and turning on the first auxiliary power supply path is controlled by the first switch and/or the convert circuit.

In an embodiment, the convert circuit includes an alternating current to direct current (AC/DC) module and a direct current to alternating current (DC/AC) module that are connected in series.

In an embodiment, the power electronic switch includes at least one of a silicon-controllable rectifier (SCR), a metal-oxide semiconductor field effect transistor (MOSFET), an insulated gate bipolar transistor (IGBT), an integrated gate commutated thyristor (IGCT) and a triode AC semiconductor switch (TRIAC).

Advantageous Effects of Disclosure

The disclosure provides a simplified fast ATS circuit structure and a control method thereof. Compared with the existing ATS circuit with a solid-state structure, the number of power switching elements with the solid-state structure in the main loop is 50% less; in the condition of ensuring product performance, lower product cost is implemented; when switching between two power sources, power-off time of the load is short, even without power-off; compared with the ATS circuit with pure mechanical structure, problems of switch arcing, power grid circulation, etc. are eliminated, and the life of mechanical contacts is longer.

BRIEF DESCRIPTION OF DRAWINGS

Various aspects, features and advantages of the present disclosure will become clearer and easier to understand from the following description of the embodiments in connection with the accompanying drawings, in which.

DETAILED DESCRIPTION

Figure 1A:
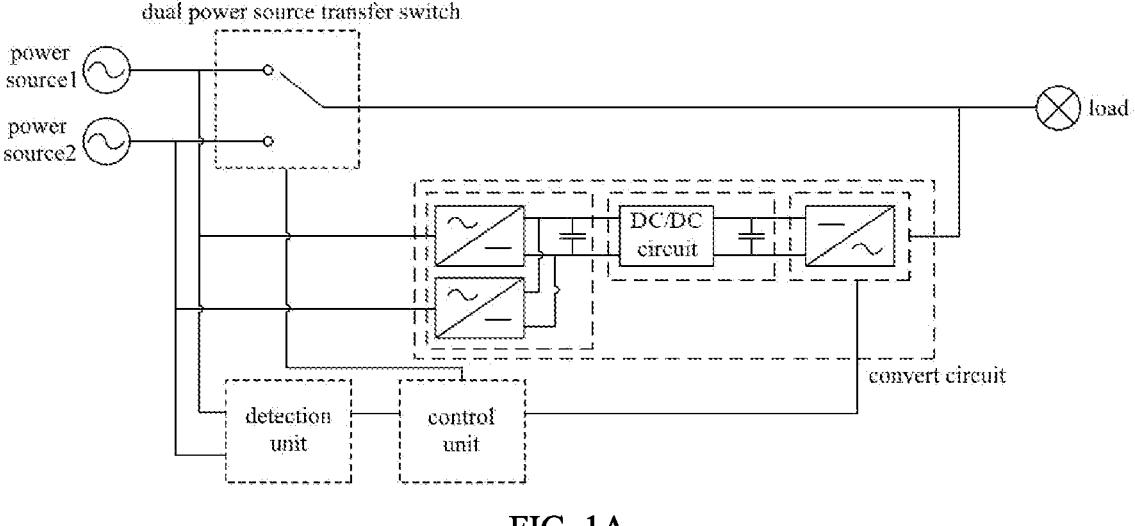
FIGS. 1A-1B are schematic circuit diagrams illustrating two types of fast ATS structures respectively.

Hereinafter, embodiments of the present disclosure will be described in detail with reference to the accompanying drawings. It should be noted that in the drawings, the same or similar elements are denoted by the same or similar reference numerals as far as possible. In addition, when describing the embodiments of the present disclosure, descriptions related to technical contents that are well known in the art and not directly related to the present disclosure will be omitted. This unnecessary description is omitted to prevent the main idea of the present disclosure from being blurred and to convey the main idea more clearly.

For the same reason, some elements may be exaggerated, omitted or schematically shown in the drawings. In addition, the size of each element does not fully reflect the actual size. In the drawings, the same or corresponding elements have the same reference numerals.

Advantages and features of the present disclosure and ways to implement them will become clear by referring to the embodiments described in detail below in connection with the accompanying drawings. However, the present disclosure is not limited to the embodiments set forth below, but may be implemented in various forms. The following embodiments are provided only to fully disclose the present disclosure and to inform those skilled in the art of its scope, and the present disclosure is only limited by the scope of the appended claims. Features of the respective described embodiments may be combined or replaced with each other unless explicitly excluded or should be excluded according to the context.

In industry, an ATS circuit (or ATSE) is mainly used to transfer between a main power source and a standby power source (or among multiple power sources) so as to continuously supply power to a load. In order to implement such power source transfer, two types of fast ATS circuit structures are given at present: 1) a mechanical structure and 2) a solid-state structure.

FIG. 1A illustrates a schematic circuit diagram of a fast ATS circuit with a mechanical structure.

Specifically, referring to FIG. 1A, the fast ATS circuit with the mechanical structure is connected between power sources (for example, a power source 1 and a power source 2, which may be alternating current power sources) and a load, and a mechanical dual power source transfer switch is arranged between the power sources and the load for switching between the power source 1 and the power source 2.

The ATS circuit with the mechanical structure includes a convert circuit connected between the power sources and the load, a detection unit connected to the power source 1 and the power source 2, and a control unit connected to the detection unit, the dual power source transfer switch and the convert circuit. The convert circuit may include an alternating current to direct current (AC/DC) power source module (AC/DC module), a direct current to direct current (DC/DC) power source module (DC/DC module) and a direct current to alternating current (DC/AC) power source module (DC/AC module), and is used to control (adjust) an output to the load so that an output of the convert circuit is adapted to the load.

The AC/DC power source module refers to a converter that transforms an alternating current into a direct current through a semiconductor power switching element, and may also be called an output-controllable switch power source or rectifier, which is a device that may form a constant current in the circuit, and a power flow direction may be bidirectional. The AC/DC power source module may have functions of isolation (for example, safety isolation, noise isolation and grounding loop elimination, etc.), protection (for example, short circuit protection, overvoltage protection, undervoltage protection, overcurrent protection, etc.), voltage transformation (for example, boost transformation, buck transformation and polarity transformation, etc.), voltage stabilization and noise reduction.

The DC/DC power source module refers to a converter that transforms a direct current into a direct current, and may also be called an output-controllable switch power source or switch adjuster. The use of the DC/DC power source module, which has the characteristics of high reliability and is easy for system upgrade, is conducive to simplifying the design of the power source circuit, shortening the development cycle and implementing the best indicators, and is widely used in communication fields such as power electronics, military industry, scientific research, industrial control devices, communication devices, instrumentation, switching devices, access devices, mobile communication, routers and industrial control, automotive electronics, aerospace and other fields. The DC/DC power source module has the characteristics of high efficiency and wide adaptive voltage range. In addition, the DC/DC power source module may have functions of voltage transformation (for example, boost transformation, buck transformation and boost-buck transformation, etc.), voltage stabilization and protection (for example, short circuit protection, overvoltage protection, undervoltage protection, overcurrent protection, etc.).

The DC/AC power source module refers to a converter that may transform a direct current into an alternating current through a semiconductor power switching element, and may also be called a DC/AC inverter circuit, which is an element opposite to a rectifier (for example, an AC/DC module), and a power flow direction may be bidirectional. The DC/AC module may have functions of isolation (for example, safety isolation, noise isolation and grounding loop elimination, etc.), protection (for example, short circuit protection, overvoltage protection, undervoltage protection, overcurrent protection, etc.), voltage transformation (for example, boost transformation, buck transformation and polarity transformation, etc.), voltage stabilization and noise reduction.

When the ATS circuit with the mechanical structure shown in FIG. 1A switches between two power sources (for example, when switching from the power source 1 to the power source 2 or switching from the power source 2 to the power source 1), the detection unit may detect the change of the power source state and provide the detected change of the power source state to the control unit; then, the control unit may control the switching of the dual power source transfer switch between the power source 1 and the power source 2, and control the power source to be switched to supply power to the load temporarily via the convert circuit (bypass) during the switching of the dual power source transfer switch, until power supplying from one power source (for example, the power source 1) to the load is switched to power supplying from another power source (for example, the power source 2) to the load on a main path (a power supply path of the power source directly to the load via the dual power source transfer switch).

However, such direct switching will cause the problems of arcing, short lifespan of the circuit and power grid circulation occurred when a mechanical switch (for example, the dual power source transfer switch) is switched. In addition, in the case of the ATS circuit with the mechanical structure, from the point of view of the load, the power-off time of the load may be too long (about 200-500 milliseconds), while in actual industry, it is expected that the power-off time of the load is about 2-5 milliseconds (reduced by 100 times) or the load is basically not powered off. Therefore, in order to solve these problems, a fast ATS circuit with a solid-state structure is proposed. The fast ATS circuit with the solid-state structure will be described in detail with reference to FIG. 1B.

Figure 1B:
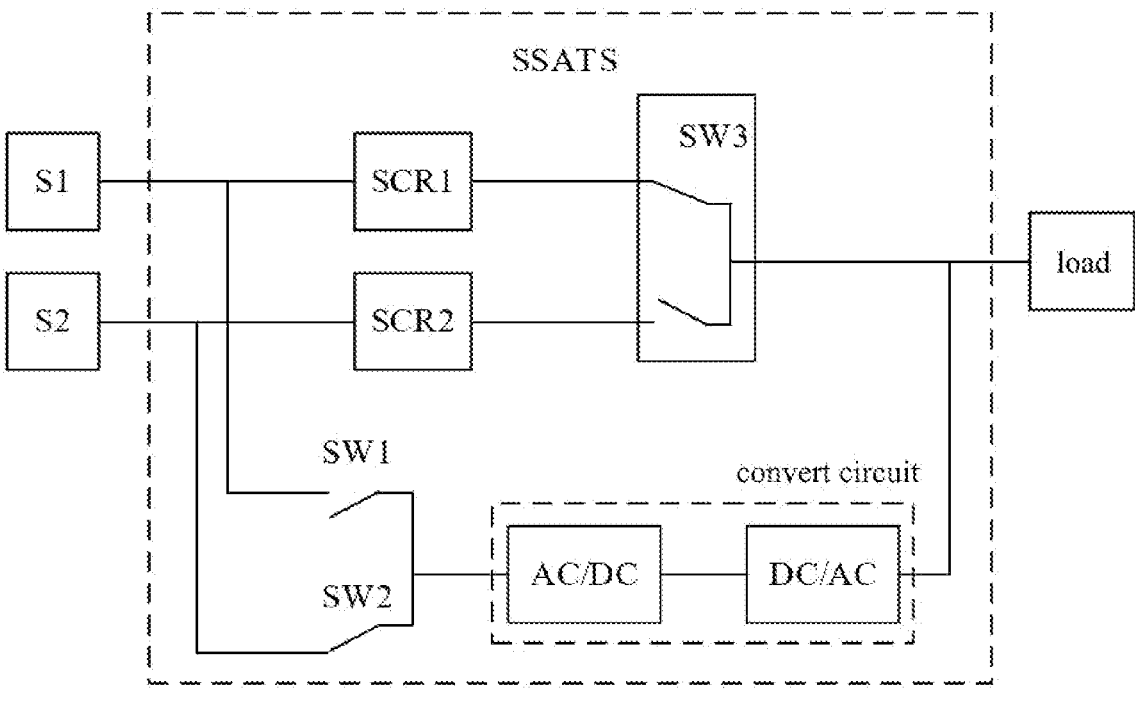

FIG. 1B illustrates a schematic circuit diagram of a fast ATS circuit with a solid-state structure (solid-state ATS (SSATS)).

Specifically, referring to FIG. 1B, similar to the fast ATS circuit with the mechanical structure described in FIG. 1A, the fast ATS circuit with the solid-state structure is also connected between power sources (for example, a first power source S1 and a second power source S2) and a load, and a transfer switch SW3 is arranged between the power sources and the load for switching between the power source 1 and the power source 2. Compared with the fast ATS circuit with the mechanical structure, in the fast ATS circuit with the solid-state structure, there are also a first power electronic switch (for example, a first silicon-controllable rectifier SCR1) and a second power electronic switch (for example, a second silicon-controllable rectifier SCR2) between the first power source S1 and the second power source S2 with the transfer switch SW3, respectively.

The power electronic switch may be a unidirectional or bidirectional switching element that may change from on to off and/or from off to on under the control of an external control signal (for example, a control signal from the control unit). It should be understood that the power electronic switch (for example, the SCR) included in the ATS circuit for switching between two alternating current power sources in the present disclosure may be a bidirectional power electronic switch (for example, a bidirectional SCR).

The present disclosure is explained and illustrated by taking a silicon-controllable rectifier (SCR) as an example of the power electronic switch, but it should be understood that the present disclosure is not limited to this, and the power electronic switch may be equivalently replaced by various power electronic switching elements that may be used, such as a metal-oxide semiconductor field effect transistor (MOSFET), an insulated gate bipolar transistor (IGBT), an integrated gate commutated thyristor (IGCT) and a triode AC semiconductor switch (TRIAC).

The ATS circuit with the solid-state structure further includes a convert circuit connected between the power sources and the load, and a first switch SW1 and a second switch SW2 connected between the convert circuit with the first power source S1 and the second power source S2 respectively. The convert circuit may include an AC/DC power source module and a direct current to alternating current DC/AC power source module, and is used to control (adjust) an output to the load so that an output of the convert circuit is adapted to the load. For convenience of description, redundant descriptions similar to those of the detection unit, the control unit, the AC/DC power source module and the direct current to alternating current DC/AC power source module described with reference to FIG. 1A are omitted here.

When the ATS circuit with the solid-state structure shown in FIG. 1B switches between two power sources (for example, when switching from the first power source S1 to the second power source S2 or switching from the second power source S2 to the first power source S1), the problems of arcing and power grid circulation will no longer occur when the transfer switch SW3 switches between the first power source S1 and the second power source S2 through on and off of SCR1 and SCR2 arranged between the first power source S1 and the second power source S2 with the transfer switch SW3.

However, the ATS circuit with the solid-state structure has the problem of high product cost (especially switching elements on a main power loop, such as SCR1 and SCR2 shown in FIG. 1B). In order to solve this problem, the present disclosure proposes a fast ATS circuit which is easier to be industrialized by further reducing the cost of the current switching element with the solid-state structure. A fast ATS structure according to an embodiment of the present disclosure will be described in detail with reference to FIG. 2.

Figures 2, 3A:
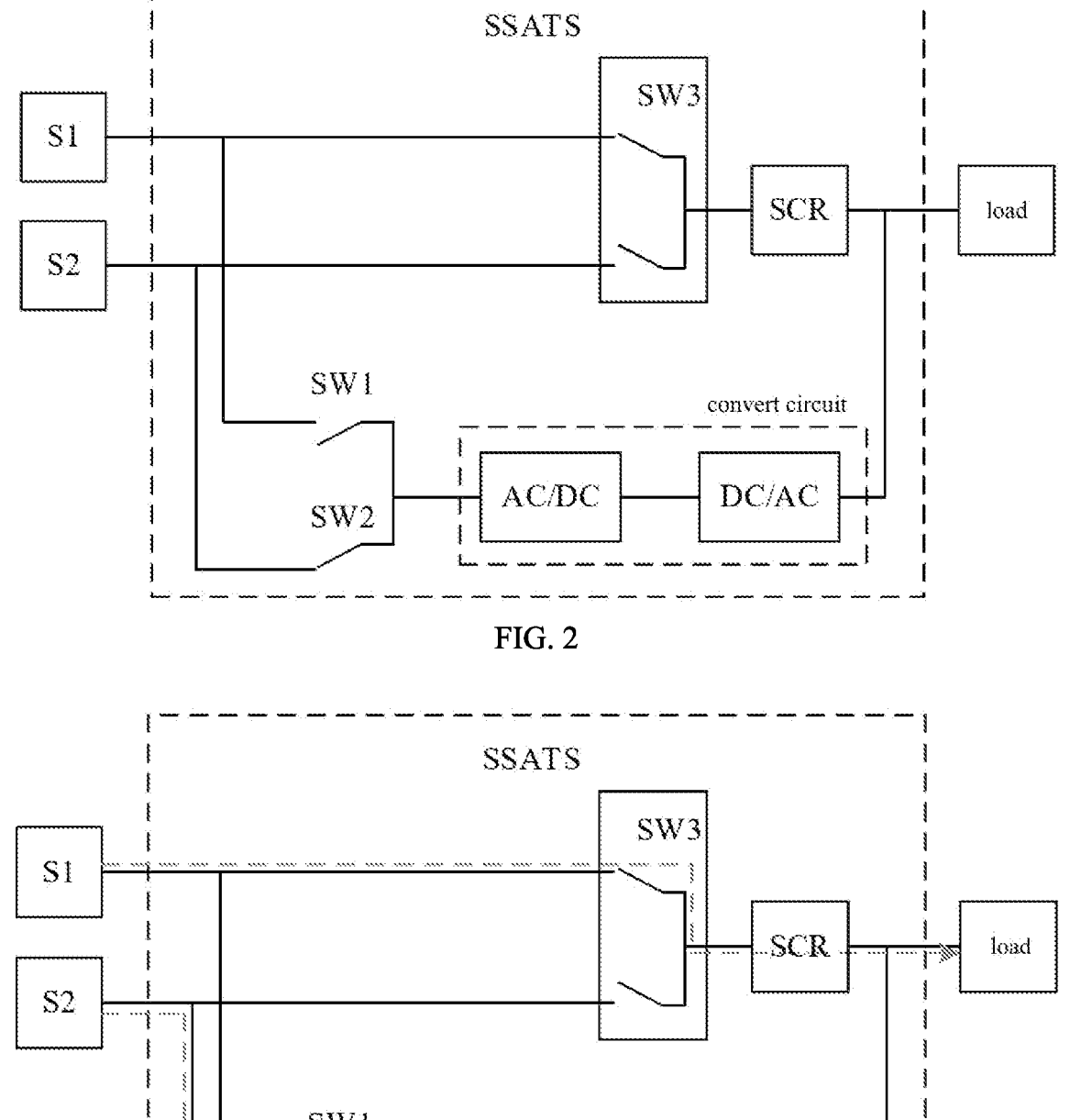
FIG. 2 is a circuit diagram illustrating a fast ATS structure according to an embodiment of the present disclosure.
FIGS. 3A-3D are schematic diagrams illustrating an internal control flow of the fast ATS circuit in FIG. 2 when switching between power sources according to an embodiment of the present disclosure.

FIG. 2 is a circuit diagram illustrating a fast ATS structure according to an embodiment of the present disclosure.

Specifically, referring to FIG. 2, in the embodiment, similar to the existing fast ATS circuit described in FIGS. 1A-1B, the fast ATS circuit of the present disclosure is connected between power sources (for example, a first power source S1 and a second power source S2) and a load, and a transfer switch SW3 is arranged between the power sources and the load for switching between the power source 1 and the power source 2. Different from the existing fast ATS circuit with the solid-state structure, a first SCR1 and a second SCR2 are not arranged between the first power source S1 and the second power source S2 with the transfer switch SW3, but an SCR is arranged between the transfer switch SW3 and the load.

In addition, the fast ATS circuit of the present disclosure also includes a convert circuit connected between the power sources and the load, and a first switch SW1 and a second switch SW2 connected between the convert circuit with the first power source S1 and the second power source S2 respectively. The convert circuit may include an AC/DC power source module and a direct current to alternating current DC/AC power source module, and be used to control (adjust) an output to the load so that an output of the convert circuit is adapted to the load. For convenience of description, redundant descriptions similar to those of the detection unit, the control unit, the AC/DC power source module and the direct current to alternating current DC/AC power source module described with reference to FIGS. 1A-1B are omitted here.

In the embodiments of the present disclosure, by changing the position of the power electronic switch (for example, the SCR) in the existing fast ATS circuit with the solid-state structure, the number of power switching elements in the main loop is halved, and the product cost is reduced. A control flow between respective internal functional modules when the fast ATS circuit of the present disclosure shown in FIG. 2 switches between the first power source S1 and the second power source S2 will be described in connection with FIGS. 3A-3D.

FIGS. 3A-3D are schematic diagrams illustrating an internal control flow of the fast ATS circuit in FIG. 2 when switching between power sources according to an embodiment of the present disclosure.

Referring to FIG. 3A, in an initial state, power is supplied to a load by a first power source S1 via a transfer switch and an SCR, as indicated by a dashed arrow in an upper part of FIG. 3A. At this time, when a detection unit (not shown) detects that a condition (for example, the first power source S1 is turned off, the first power source S1 is unstable or a voltage of the first power source S1 is too low) that it is required to switch from power supplying of the first power source S1 to the load to power supplying of the second power source S2 to the load is satisfied, a control unit (not shown) may turn off a power supply path (first main power supply path) through which the first power source S1 supplies power to the load via the transfer switch and the SCR by turning off the SCR based on the detection result of the detection unit, as indicated by a dashed arrow in an upper part of FIG. 3B.

It may be understood that in the initial state, the second power source S2 may supply power to a DC/AC module included in a convert circuit via a second switch SW2 (second auxiliary power supply path), and the power supplied by the second power source S2 is cut off at the DC/AC module, as indicated by a dashed arrow in a lower part of FIG. 3A. In this case, power may be quickly supplied to the load from the DC/AC power source module via the second auxiliary power supply path in a case that the first main power supply path is turned off, so that the power-off time of the load is short or the load is hardly powered off, as indicated by a dashed arrow in a lower part of FIG. 3B. It may be understood that in the initial state, the second power source S2 may not supply power to the DC/AC module included in the convert circuit via the second auxiliary power supply path, but supply power to the load via the second auxiliary power supply path at the same time when or after the first main power supply path is turned off, as indicated by the dashed arrow in the lower part of FIG. 3B.

Figures 3B, 3C:
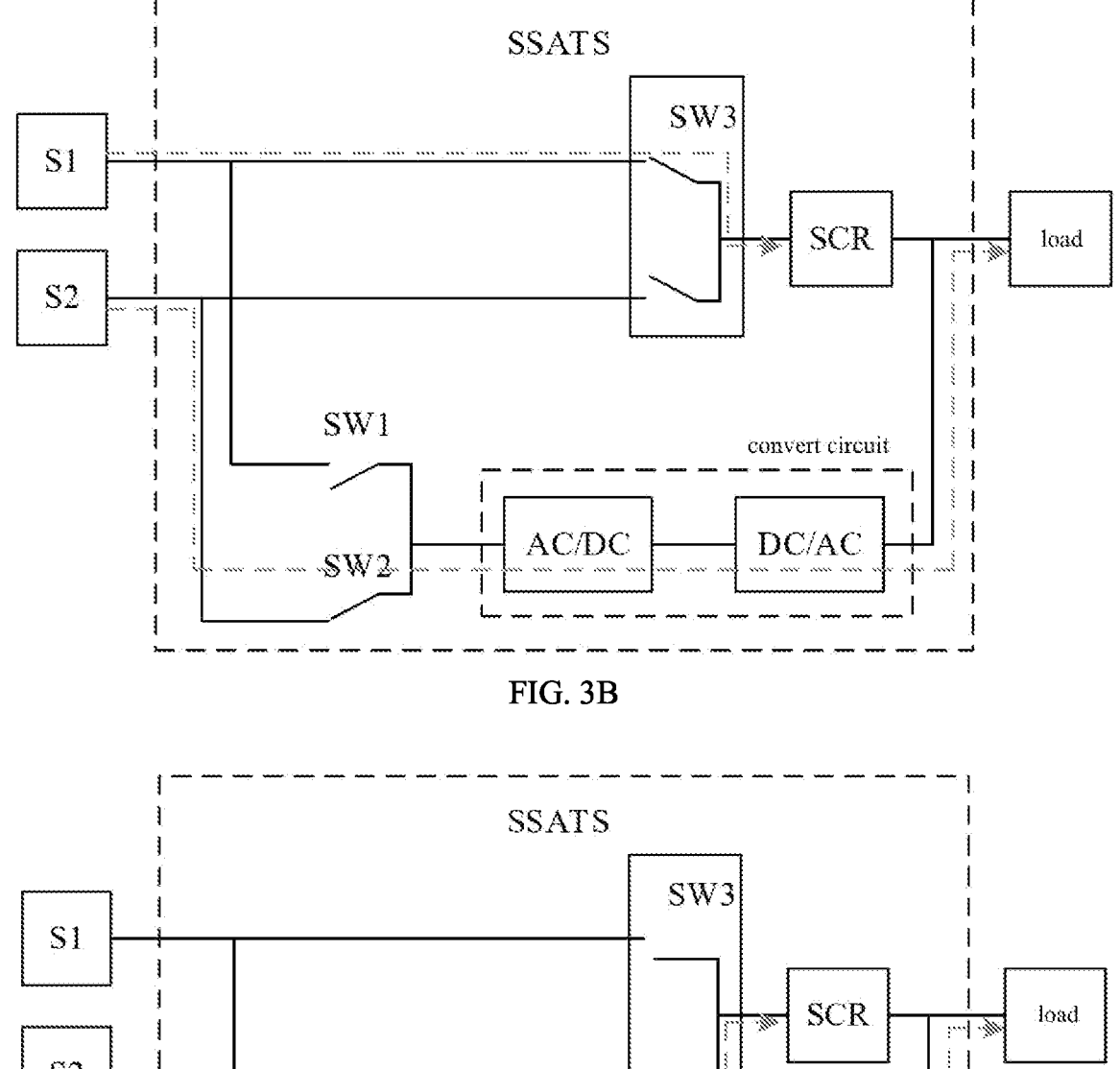

Next, referring to FIG. 3C, in FIG. 3C, when the second power source S2 supplies power to the load via the second auxiliary power supply path, the transfer switch SW3 switches from the first power source S1 to the second power source S2 (i.e., from the first main power supply path to a second main power supply path of the second power source S2 to the load via the transfer switch SW3 and the SCR) (under the control of the control unit), and the power supplied by the second power source S2 via the second main power supply path is cut off at the SCR, as indicated by the dashed arrow in the upper part of FIG. 3B. At this time, the load is supplied power by the second power source S2 via the second auxiliary power supply path.

Figure 3D:
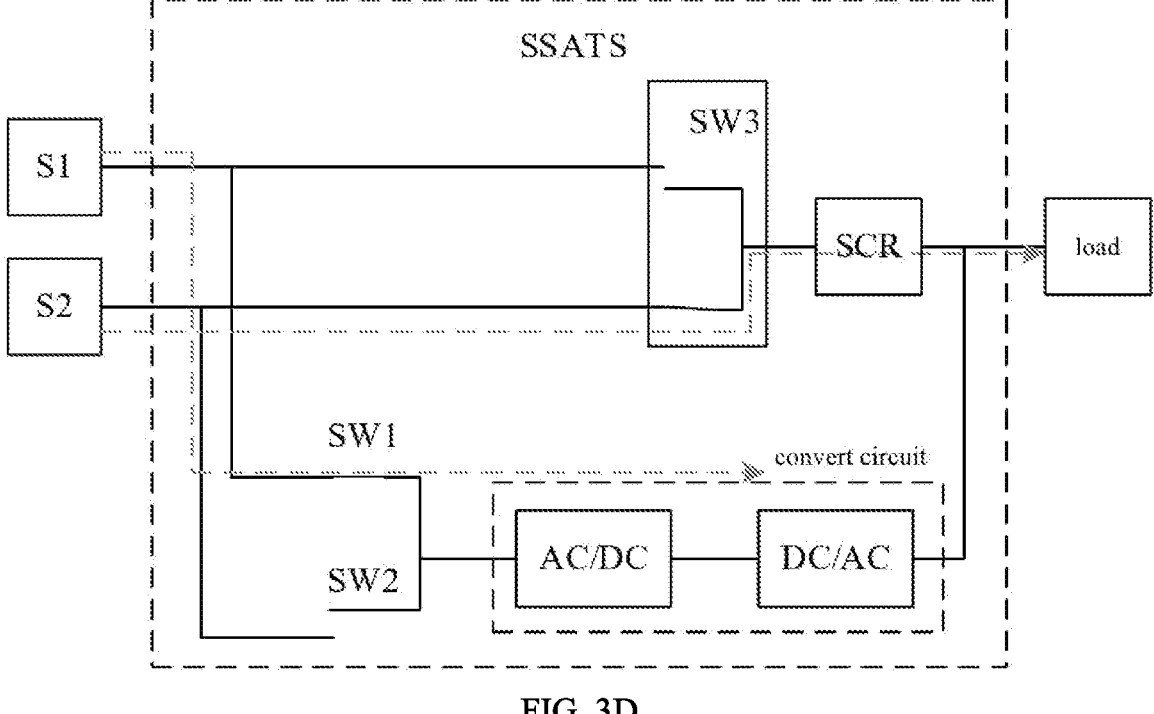

Then, referring to FIG. 3D, after the process of the transfer switch SW3 switching from the first power source S1 to the second power source S2 is completed, the second main power supply path may be turned on by turning on the SCR, to supply power to the load by the second power source S2 via the second main power supply path, as indicated by a dashed arrow in an upper part of FIG. 3D. It may be understood that the second auxiliary power supply path may be turned off by turning off the second switch SW2 or the DC/AC power source module included in the convert circuit at the same time when or after the second power source S2 supplies power to the load via the second main power supply path. In addition, as indicated by a dashed arrow in a lower part of FIG. 3D, in a case that the second power source S2 supplies power to the load via the second main power supply path, there may be a case that the first power source S1 supplies power to the convert circuit via a first switch, and the power supplied by the first power source S1 is cut off at the DC/AC included in the convert circuit, so as to implement a short power-off time or almost no power-off of the load when it is necessary to switch from power supplying of the second power source S2 to the load to power supplying of the first power source S1 to the load.

To sum up, compared with the existing ATS circuit with the solid-state structure, the ATS circuit of the present disclosure implements same functions as the existing ATS circuit with the solid-state structure by only arranging a power electronic switch (for example, an SCR) between the transfer switch (for example, SW3) and the load, but the number of power electronic switches is reduced by 50%, thus greatly reducing the cost of the product.

It should be understood that in practice, the convert circuit (elements included in the convert circuit, such as the AD/DC module, the DC/DC module and the DC/AC module, etc.) and the power electronic switch (for example, the SCR) in the switching circuit or element (for example, the ATSE) described according to the embodiments of the present disclosure may be selected or designed depending on external power sources (for example, the power source 1 and the power source 2 shown in FIG. 1A) and actual loads.

In addition, it should also be understood that although the present disclosure describes the switching of the fast ATS circuit between power sources by taking two power sources as an example, the fast ATS circuit structure according to the embodiment of the present disclosure is also feasible for switching between multiple power sources.

The specific embodiments of the present disclosure have been illustrated and described above with reference to the accompanying drawings. In the case of the structure of the fast ATS circuit and the control method thereof proposed by the present disclosure, compared with the existing ATS circuit with a solid-state structure, the number of power switching elements with the solid-state structure in the main loop is 50% less; in the condition of ensuring product performance, lower product cost is implemented; when switching between two power sources, the power-off time of the load is short, even without power-off; compared with the ATS circuit with pure mechanical structure, the problems of switch arcing, power grid circulation, etc. are eliminated, and the life of mechanical contacts is longer.

The entirety or parts of the hardware apparatus described in the present disclosure may be implemented by various suitable hardware means, including but not limited to FPGA, ASIC, SoC, discrete gate or transistor logic, discrete hardware component, or any combination thereof.

The block diagrams of circuits, elements, apparatuses, devices and systems involved in the present disclosure are only examples and are not intended to require or imply that they must be connected, disposed and configured in the way as shown in the accompanying drawings. As will be recognized by those skilled in the art, these circuits, elements, apparatuses, devices and systems may be connected, disposed and configured in any way, as long as the desired purpose may be implemented.

The description set forth herein, taken in conjunction with the drawings, describes example configurations, methods and apparatuses, and does not represent all examples that may be implemented or are within the scope of the claims. As used herein, the term "example" means "serving as an example, instance or illustration" rather than "preferred" or "superior to other examples". The detailed description includes specific details in order to provide an understanding of the described technology. However, these techniques may be practiced without these specific details. In some cases, well-known structures and devices are shown in block diagram form to avoid obscuring the concepts of the described examples.

Although this specification contains many specific implementation details, these should not be interpreted as limitations on any invention or the scope of the claimed protection, but as descriptions of specific features of specific embodiments of specific inventions. Some features described in this specification in the context of separate embodiments may also be combined in a single embodiment. On the contrary, various features described in the context of a single embodiment may also be implemented separately in multiple embodiments or in any suitable subcombination. Furthermore, although features may be described above as functioning in certain combinations, and even initially claimed as such, in some cases, one or more features from the claimed combination may be deleted from the combination, and the claimed combination may be directed to a subcombination or a variation of a subcombination.

It should be understood by those skilled in the art that the above specific embodiments are only examples rather than limitations, and various modifications, combinations, partial combinations and replacements may be made to the embodiments of the present disclosure according to design requirements and other factors, as long as they are within the scope of the appended claims or their equivalents, that is, they belong to the scope as claimed by the present disclosure.

What is claimed is:

1. A switching circuit comprising:
a main power supply circuit connected between power sources and a load, wherein the power sources comprise a first power source and a second power source, and the main power supply circuit comprises:
a transfer switch connected between the power sources and the load and configured to switch between the first power source and the second power source; and a power electronic switch for turning on or off the main power supply circuit,
wherein the power electronic switch is connected between the transfer switch and the load; and
an auxiliary power supply circuit connected in parallel with the main power supply circuit, wherein the auxiliary power supply circuit comprises:
a first switch connected to the first power source;
a second switch connected to the second power source; and
a convert circuit connected between the first switch and the second switch with the load and configured to control an output to the load.

2. The switching circuit of claim 1, further comprising:
a detection unit for detecting states of the first power source and the second power source; and
a control unit configured to perform, based on a detection result of the detection unit, at least one of:
controlling the transfer switch to switch between the first power source and the second power source;
controlling turn-on and turn-off of the first switch and the second switch; and
controlling turn-on and turn-off of the power electronic switch.

3. The switching circuit of claim 1, wherein the power electronic switch comprises at least one of a silicon-controllable rectifier (SCR), a metal-oxide semiconductor field effect transistor (MOSFET), an insulated gate bipolar transistor (IGBT), an integrated gate commutated thyristor (IGCT) or a triode AC semiconductor switch (TRIAC).

4. The switching circuit of claim 1, wherein the convert circuit comprises an alternating current to direct current (AC/DC) module and a direct current to alternating current (DC/AC) module that are connected in series.

5. A control method of a switching circuit which is connected between a first power source and a second power source with a load and comprises a transfer switch and a power electronic switch, the transfer switch configured to switch between the first power source and the second power source, the method comprising:
turning off a first main power supply path by turning off the power electronic switch, wherein the first main power supply path is a path through which the first power source supplies power to the load via the transfer switch and the power electronic switch;
supplying power to the load when the power electronic switch is turned off by turning on a second auxiliary power supply path, wherein the second auxiliary power supply path is connected in parallel with the first main power supply path;
switching the first main power supply path to a second main power supply path by switching the transfer switch from the first power source to the second power source, wherein the second main power supply path is a path through which the second power source supplies power to the load via the transfer switch and the power electronic switch;
turning on the second main power supply path by turning on the power electronic switch to supply power to the load; and
turning off the second auxiliary power supply path,
wherein the power electronic switch is connected between the transfer switch and the load.

6. The method of claim 5, wherein the second auxiliary power supply path is a path through which the second power source supplies power to the load via a second switch and a convert circuit for controlling an output to the load; and wherein turning off and turning on the second auxiliary power supply path is controlled by at least one of the second switch or the convert circuit.

7. The method of claim 6, wherein a first auxiliary power supply path is further arranged between the first power source and the load, the first auxiliary power supply path being a path through which the first power source supplies power to the load via a first switch and the convert circuit, wherein turning off and turning on the first auxiliary power supply path is controlled by at least one of the first switch or the convert circuit.

8. The method of claim 6, wherein the convert circuit comprises an alternating current to direct current (AC/DC) module and a direct current to alternating current (DC/AC) module that are connected in series.

9. The method of claim 5, wherein the power electronic switch comprises at least one of a silicon-controllable rectifier (SCR), a metal-oxide semiconductor field effect transistor (MOSFET), an insulated gate bipolar transistor (IGBT), an integrated gate commutated thyristor (IGCT) or a triode AC semiconductor switch (TRIAC).

10. A control method of a switching circuit which is connected between a first power source and a second power source with a load and comprises a transfer switch and a power electronic switch, the transfer switch configured to switch between the first power source and the second power source, the method comprising:

turning off a first main power supply path by turning off the power electronic switch, wherein the first main power supply path is a path through which the first power source supplies power to the load via the transfer switch and the power electronic switch;

turning on a second auxiliary power supply path to supply power to the load, wherein the second auxiliary power supply path is connected in parallel with the first main power supply path, wherein the second auxiliary power supply path is a path through which the second power source supplies power to the load via a second switch and a convert circuit for controlling an output to the load, and wherein turning off and turning on the second auxiliary power supply path is controlled by at least one of the second switch or the convert circuit;

switching the first main power supply path to a second main power supply path by switching the transfer switch from the first power source to the second power source, wherein the second main power supply path is a path through which the second power source supplies power to the load via the transfer switch and the power electronic switch;

turning on the second main power supply path by turning on the power electronic switch to supply power to the load; and turning off the second auxiliary power supply path, wherein the power electronic switch is connected between the transfer switch and the load.

11. The method of claim 10, wherein a first auxiliary power supply path is further arranged between the first power source and the load, the first auxiliary power supply path being a path through which the first power source supplies power to the load via a first switch and the convert circuit, wherein turning off and turning on the first auxiliary power supply path is controlled by at least one of the first switch or the convert circuit.

12. The method of claim 10, wherein the convert circuit comprises an alternating current to direct current (AC/DC) module and a direct current to alternating current (DC/AC) module that are connected in series.

13. The method of claim 10, wherein the power electronic switch comprises at least one of a silicon-controllable rectifier (SCR), a metal-oxide semiconductor field effect transistor (MOSFET), an insulated gate bipolar transistor (IGBT), an integrated gate commutated thyristor (IGCT) or a triode AC semiconductor switch (TRIAC).

* * * * *